(12) United States Patent
Smith

(10) Patent No.: US 11,761,381 B2
(45) Date of Patent: Sep. 19, 2023

(54) GAS TURBINE ENGINE COMPRISING LIQUID HYDROGEN EVAPORATORS AND HEATERS

(71) Applicant: Pratt & Whitney Canada Corp., Longueuil (CA)

(72) Inventor: Scott Smith, St. Lambert (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/402,502

(22) Filed: Aug. 14, 2021

(65) Prior Publication Data

US 2023/0045911 A1 Feb. 16, 2023

(51) Int. Cl.
| | |
|---|---|
| F02C 7/224 | (2006.01) |
| F02C 3/20 | (2006.01) |
| F02C 6/08 | (2006.01) |
| F02C 6/10 | (2006.01) |
| F02C 7/14 | (2006.01) |
| F02C 7/32 | (2006.01) |

(Continued)

(52) U.S. Cl.
CPC ............... *F02C 7/224* (2013.01); *F02C 3/20* (2013.01); *F02C 6/08* (2013.01); *F02C 6/10* (2013.01); *F02C 7/14* (2013.01); *F02C 7/32* (2013.01); *F02C 7/36* (2013.01); *F02C 9/28* (2013.01)

(58) Field of Classification Search
CPC ...... F02C 6/08; F02C 6/10; F02C 7/14; F02C 7/143; F02C 7/18; F02C 7/22; F02C 7/222; F02C 7/224; F02C 3/20; F02C 9/40
See application file for complete search history.

(56) References Cited

U.S. PATENT DOCUMENTS

| | | | | |
|---|---|---|---|---|
| 3,237,401 | A * | 3/1966 | Peters | F02C 7/224 |
| | | | | 60/260 |
| 3,241,311 | A * | 3/1966 | Kuhrt | F02C 1/007 |
| | | | | 60/269 |

(Continued)

FOREIGN PATENT DOCUMENTS

| | | |
|---|---|---|
| CN | 111852688 A | 10/2020 |
| EP | 3995679 A1 | 5/2022 |

(Continued)

OTHER PUBLICATIONS

European Search Report issued in counterpart application 22189996.6 dated Jan. 12, 2023.

(Continued)

*Primary Examiner* — William H Rodriguez
(74) *Attorney, Agent, or Firm* — NORTON ROSE FULBRIGHT CANADA LLP

(57) ABSTRACT

In accordance with at least on aspect of this disclosure, there is provided a hydrogen fuel system for aircraft. The hydrogen fuel system includes a gas turbine engine and a fuel feed conduit. The fuel feed conduit is defined at least in part by, in fluid series, a liquid hydrogen tank fluidly connected to a combustor of the gas turbine engine, a liquid hydrogen pump to drive fuel to the combustor of the gas turbine engine, an evaporator, and an electric heat source in thermal communication with the evaporator to add heat into a flow of hydrogen passing through the evaporator. In embodiments, the electric energy source associated with the electric heat source to power the electric heat source.

19 Claims, 4 Drawing Sheets

(51) Int. Cl.
*F02C 7/36* (2006.01)
*F02C 9/28* (2006.01)

(56) References Cited

U.S. PATENT DOCUMENTS

| | | | | |
|---|---|---|---|---|
| 3,382,672 | A * | 5/1968 | French | F02C 9/40 60/243 |
| 4,062,184 | A * | 12/1977 | Hagen | F02C 3/22 60/39.282 |
| 5,185,541 | A * | 2/1993 | Jensen | H02N 3/00 60/39.35 |
| 5,363,641 | A * | 11/1994 | Dixon | F02C 6/08 60/788 |
| 6,079,222 | A * | 6/2000 | Fetescu | F17C 9/04 62/915 |
| 10,989,117 | B2 * | 4/2021 | Roberge | F02C 3/22 |
| 11,041,439 | B2 * | 6/2021 | Roberge | F02C 7/224 |
| 11,448,133 | B2 * | 9/2022 | Cocks | F02C 7/36 |
| 2006/0185347 | A1 * | 8/2006 | Knapp | F01C 13/04 60/269 |
| 2007/0277528 | A1 * | 12/2007 | Homitz | F23D 14/08 60/737 |
| 2008/0148881 | A1 * | 6/2008 | Moniz | F02C 7/32 74/15.6 |
| 2011/0265488 | A1 * | 11/2011 | Lawson | F02C 7/232 60/39.55 |
| 2012/0042656 | A1 | 2/2012 | Donnelly et al. | |
| 2012/0117978 | A1 * | 5/2012 | Allam | F02C 7/141 60/783 |
| 2014/0199642 | A1 | 7/2014 | Ramotowski et al. | |
| 2015/0337730 | A1 | 11/2015 | Kupiszewski et al. | |
| 2017/0356390 | A1 * | 12/2017 | Frolov | F02C 6/20 |
| 2019/0153953 | A1 | 5/2019 | Niergarth et al. | |
| 2020/0088098 | A1 | 3/2020 | Roberge | |
| 2020/0088102 | A1 * | 3/2020 | Roberge | F02C 7/224 |
| 2020/0386189 | A1 | 12/2020 | Powell et al. | |
| 2021/0207537 | A1 * | 7/2021 | Roberge | F02C 7/22 |
| 2021/0340908 | A1 * | 11/2021 | Boucher | F02C 7/224 |
| 2021/0348561 | A1 * | 11/2021 | Cocks | F02C 3/22 |
| 2022/0099020 | A1 * | 3/2022 | Palmer | F23R 3/04 |
| 2022/0099299 | A1 * | 3/2022 | Garrotte | F02C 3/22 |
| 2022/0145801 | A1 * | 5/2022 | McCurdy Gibson | F02C 3/22 |
| 2022/0195928 | A1 * | 6/2022 | Johnson | F02C 7/141 |
| 2022/0297844 | A1 * | 9/2022 | Mackin | B64D 27/24 |

FOREIGN PATENT DOCUMENTS

| | | |
|---|---|---|
| KR | 102062484 | 2/2020 |
| RU | 2746082 | 4/2021 |
| WO | WO-2012024683 A1 | 2/2012 |
| WO | WO-2014105327 A1 | 7/2014 |

OTHER PUBLICATIONS

European Search Report issued in counterpart application 22189996.6 dated Apr. 14, 2023.

* cited by examiner

GAS TURBINE ENGINE COMPRISING LIQUID HYDROGEN EVAPORATORS AND HEATERS

TECHNICAL FIELD

The present disclosure relates generally to alternative fuel aircraft, and more particularly to hydrogen powered aircraft.

BACKGROUND

In aerospace applications, hydrogen is often considered as a fuel whenever low carbon emissions are desired. Hydrogen is often stored cryogenically in order to maximize its energy density per unit volume, however it must first be evaporated to a gaseous state before use in combustion. There is always a need for improvements to systems and methods for converting the liquid hydrogen into a gaseous state for use in combustion in the aerospace industry.

SUMMARY

In accordance with at least on aspect of this disclosure, there is provided a hydrogen fuel system for aircraft. The hydrogen fuel system includes a gas turbine engine and a fuel feed conduit. The fuel feed conduit is defined at least in part by, in fluid series, a liquid hydrogen tank fluidly connected to a combustor of the gas turbine engine, a liquid hydrogen pump to drive fuel to the combustor of the gas turbine engine, an evaporator, and an electric heat source in thermal communication with the evaporator to add heat into a flow of hydrogen passing through the evaporator. In embodiments, the electric energy source associated with the electric heat source to power the electric heat source.

In embodiments, the fuel feed conduit is further defined by, in fluid series downstream of the evaporator, an accumulator, a pressure regulator, a gaseous hydrogen metering unit, a manifold shut-off valve, and a fuel manifold.

In certain embodiments, an upstream working fluid conduit in fluid communication with the evaporator and defined at least in part by an electric heat source operative to add heat into the working fluid for heat exchange with the flow of hydrogen passing through the evaporator, and an upstream working fluid pump to drive the working fluid through the evaporator. In certain such embodiments, the electric energy source is external to the gas turbine engine, and the electric energy source includes at least one of: an auxiliary power unit, an electric generator, and/or a battery operatively connected to power the electric heat source.

In embodiments, the fuel feed conduit is further defined by a gaseous hydrogen pump downstream of the evaporator drive a flow of gaseous hydrogen from the evaporator to the combustor of the gas turbine engine, and a gaseous hydrogen heater downstream of the gaseous hydrogen pump and upstream of the gas turbine engine, wherein the gaseous hydrogen heater is associated with an engine heat source internal to the engine to add heat to the flow of gaseous hydrogen passing through the gaseous hydrogen heater.

In certain embodiments, the engine heat source is compressor bleed air from a compressor section. In certain such embodiments, a bleed air conduit is defined at least in part by the compressor section of the gas turbine engine and the gaseous hydrogen heater to add heat to the flow of gaseous hydrogen passing through the gaseous hydrogen heater and to cool the compressor bleed air passing through the gaseous hydrogen heater. An environmental control system return conduit is defined at least in part by the compressor section of the gas turbine engine and an environmental control system to flow the cooled compressor bleed air to the environmental control system.

In certain embodiments, the engine heat source is turbine exhaust from a turbine exhaust section of the gas turbine engine. In certain embodiments, a downstream working fluid conduit defined at least in part by the turbine exhaust section of the gas turbine engine, the gaseous hydrogen heater, and a downstream working fluid pump to drive heated downstream working fluid to the gaseous hydrogen heater to add heat to the flow of gaseous hydrogen passing through the gaseous hydrogen heater. In certain such embodiments, the downstream working fluid conduit is at least partially coiled around the turbine exhaust section of the gas turbine engine to add heat from the turbine exhaust section of the gas turbine engine to the flow of downstream working fluid in the downstream working fluid conduit.

In certain embodiments, the engine heat source is engine fluid. In certain such embodiments, an engine fluid conduit defined at least in part by, in fluid series, an engine fluid source, the gaseous hydrogen heater, and an engine fluid return to add heat from the engine fluid to the flow of gaseous hydrogen passing through the gaseous hydrogen heater.

In certain embodiments, the fuel feed conduit is further defined by a gaseous hydrogen pump downstream of the evaporator drive a flow of gaseous hydrogen from the evaporator to the combustor of the gas turbine engine, and a gaseous hydrogen heater downstream of the gaseous hydrogen pump and upstream of the gas turbine engine. In certain such embodiments, the gaseous hydrogen heater is associated with an electric heat source to add heat to the flow of gaseous hydrogen passing through the gaseous hydrogen heater, wherein the electric heat source is external to, but powered by an electric energy module driven the gas turbine engine.

In certain embodiments, a gear box operatively connected to be driven by a spool shaft of the gas turbine engine, wherein the electric energy source includes an electric generator operatively connected to be driven by the gear box to power the electric heat source associated with the gaseous hydrogen heater. In certain such embodiments, a downstream working fluid conduit defined at least in part by, the gaseous hydrogen heater, the electric heat source to heat the downstream working fluid, a downstream working fluid pump to drive the downstream working fluid to the gaseous hydrogen heater to add heat to the flow of gaseous hydrogen passing through the gaseous hydrogen heater.

In accordance with another aspect of this disclosure, there is provided a multi-stage heating system. In embodiments, the multi-stage heating system includes a gas turbine engine and a fuel feed conduit. In embodiments, the fuel feed conduit is defined at least in part by, in fluid series, a liquid hydrogen tank fluidly connected to a combustor of the gas turbine engine, a liquid hydrogen pump to drive fuel to the combustor of the gas turbine engine, an evaporator in thermal communication with an upstream heat source to add heat into a flow of hydrogen passing through the evaporator, and a gaseous hydrogen heater in thermal communication with a downstream heat source to add heat into the flow of gaseous hydrogen passing through the gaseous hydrogen heater. In embodiments, the upstream heat source is external to the gas turbine engine and the downstream heat source is internal to the gas turbine engine.

In accordance with another aspect of this disclosure, there is provided a method of heating fuel in an aircraft. In embodiments, the method includes heating a flow of liquid hydrogen with an evaporator in thermal communication with an upstream heat source to convert the flow of liquid hydrogen to a flow of gaseous hydrogen, and heating the flow of gaseous hydrogen with a gaseous hydrogen heater in thermal communication with a downstream heat source. In certain embodiments, the upstream heat source is external to a gas turbine engine and the downstream heat source is internal to the gas turbine engine.

In embodiments, the heating the flow of liquid hydrogen includes exchanging heat between an upstream working fluid in thermal communication with the upstream heat source and the flow of liquid hydrogen in the evaporator. In embodiments, the method includes powering the upstream heat source with at least one of an auxiliary power unit, an electric generator, and/or an electric energy module.

In certain embodiments, the heating the flow of gaseous hydrogen includes exchanging heat between an engine fluid and the flow of gaseous hydrogen in the gaseous hydrogen heater, where the engine fluid includes at least one of: compressor bleed air, turbine exhaust, and/or engine oil. In certain embodiments, the heating the flow of gaseous hydrogen includes exchanging heat between a downstream working fluid in thermal communication with the downstream heat source and the flow of gaseous hydrogen in the gaseous hydrogen heater. In certain such embodiments, the method includes powering the downstream heat source with an electric generator driven by the gas turbine engine.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
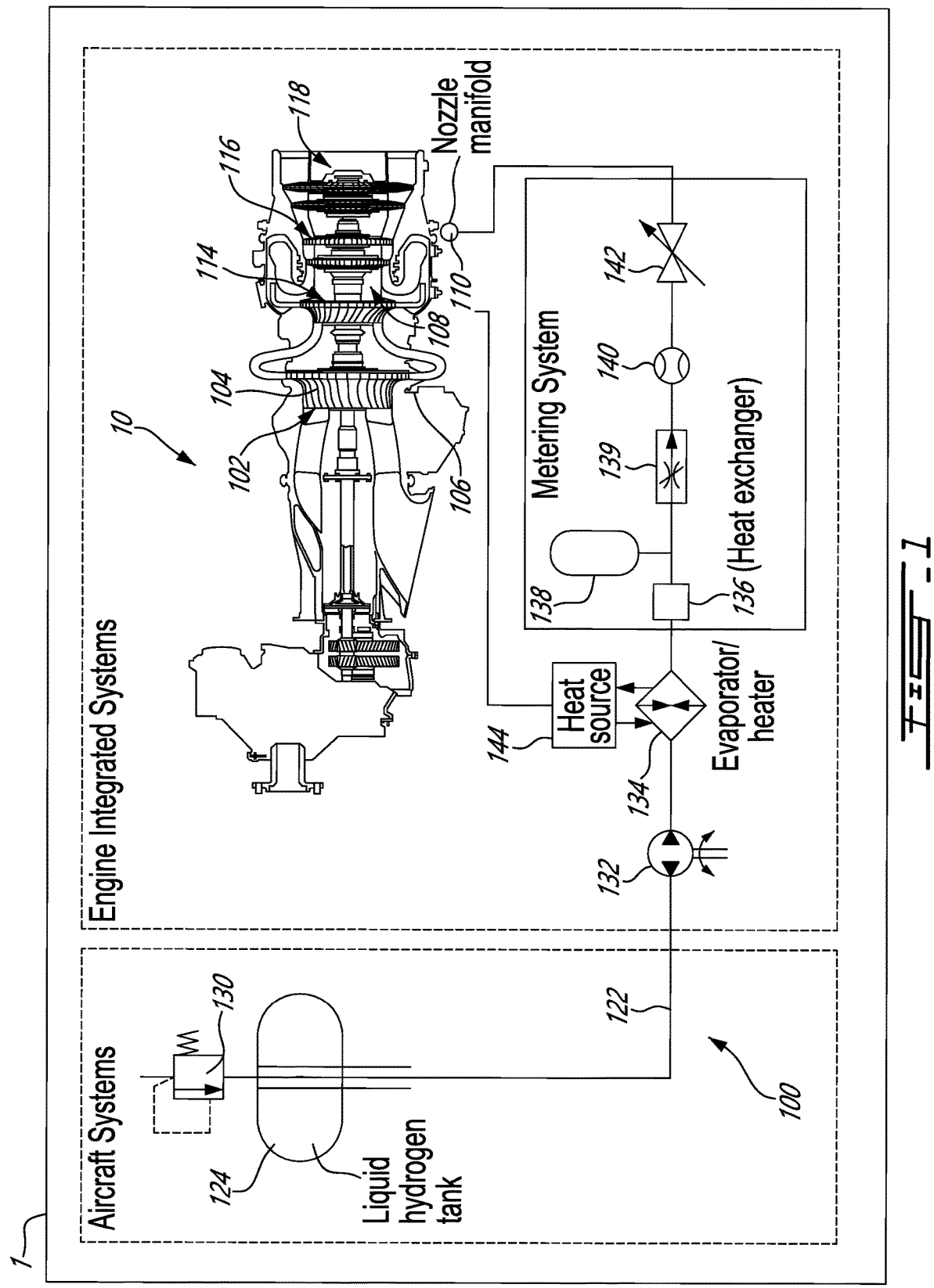
FIG. 1 is schematic view of an embodiment of a single stage heated fuel system constructed in accordance with at least one aspect of this disclosure, showing a heat source for a liquid hydrogen evaporator.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-6. Certain embodiments described herein can be used to improve conversion of liquid hydrogen fuel to gaseous hydrogen for combustion.

The present disclosure relates generally to fuel control for gas turbine engines, and more particularly to control of gaseous fuel flow. A gas turbine engine may be fueled with gaseous fuel such as hydrogen gas. It is possible to gasify liquid hydrogen from an aircraft supply through an appropriate fuel pump, heat exchangers, pressure regulator, and metering valves. However, conventional gasification methods may not provide sufficient heat to the liquid hydrogen to offer full or efficient combustion.

In certain embodiments, referring to FIG. 1, an aircraft 1 can include an engine 10, where the engine 10 can be a propulsive energy engine (e.g. creating thrust for the aircraft 1), or a non-propulsive energy engine, and a fuel system 100. As described herein, the engine 10 is a turbofan engine, although the present disclosure may likewise be used with other engine types. The engine 100 includes a compressor section 102 having a compressor 104 in a primary gas path 106 to supply compressed air to a combustor 108 of the aircraft engine 100. The primary gas path 106 includes a nozzle manifold 110 for issuing fluid to the combustor 108.

The primary gas path 106 includes, in fluid communication in a series: the compressor 104, the combustor 108 fluidly connected to an outlet 114 of the compressor 104, and a turbine section 116 fluidly connected to an outlet 118 of the combustor 108. The turbine section 116 is mechanically connected to the compressor 104 to drive the compressor 104.

A fuel feed conduit 122 is defined at least in part by a gaseous fuel supply 124, a plurality of fuel nozzles, and the combustor 108 of the gas turbine engine 100. In embodiments, the gaseous fuel supply 124 can be any suitable gaseous fuel, such as a gaseous pressure and/or temperature regulated fuel supply, which may be or include hydrogen gas.

In embodiments, the fuel feed conduit can further be defined, in fluid series or any suitable order or combination between the combustor 108 and the gaseous fuel supply 124, by a fuel shut off valve 130, a fuel pump 132, a liquid/gaseous fuel evaporator/heater 134, a turbine air cooling heat exchanger 136, a gaseous fuel accumulator 138, a pressure regulator 139, a gaseous fuel metering unit 140, and/or a fuel manifold shut off valve 142, and by fuel lines interconnecting therebetween. In certain embodiments, the pre-pressurized gaseous fuel accumulator 138 can be used as backup supply pressure source.

As shown in FIG. 1, the fuel system 100 includes the a evaporator/heater 134 where heat is supplied from any suitable heat source 144, for example engine fluid to evaporate/heat the liquid hydrogen therein. The evaporator/heater 134 can be an evaporator and/or a heater. For example, if an evaporator, the evaporator 134 converts liquid hydrogen to gaseous hydrogen therein. However, in certain embodiments, the evaporator/heater 134 is only a heater, in which the heater 134 receives heated liquid from an external source to exchange heat with the liquid hydrogen therein, but does not necessarily evaporate the liquid hydrogen or may only evaporate some. Similarly, the evaporator/heater 134 can be exclusively a heater if it receives gas solely to add heat to the gas, without any conversion of state. In some instances, it may be that the engine fluid alone is insufficient to entirely evaporate the flow of liquid hydrogen in the evaporator 134, or it may be that the engine fluid alone is unable to heat the liquid and/or gaseous hydrogen to a heat acceptable for desired engine performance. Therefore, a multi-stage heating system (e.g. systems 200-600) is provided herein.

Figure 2:
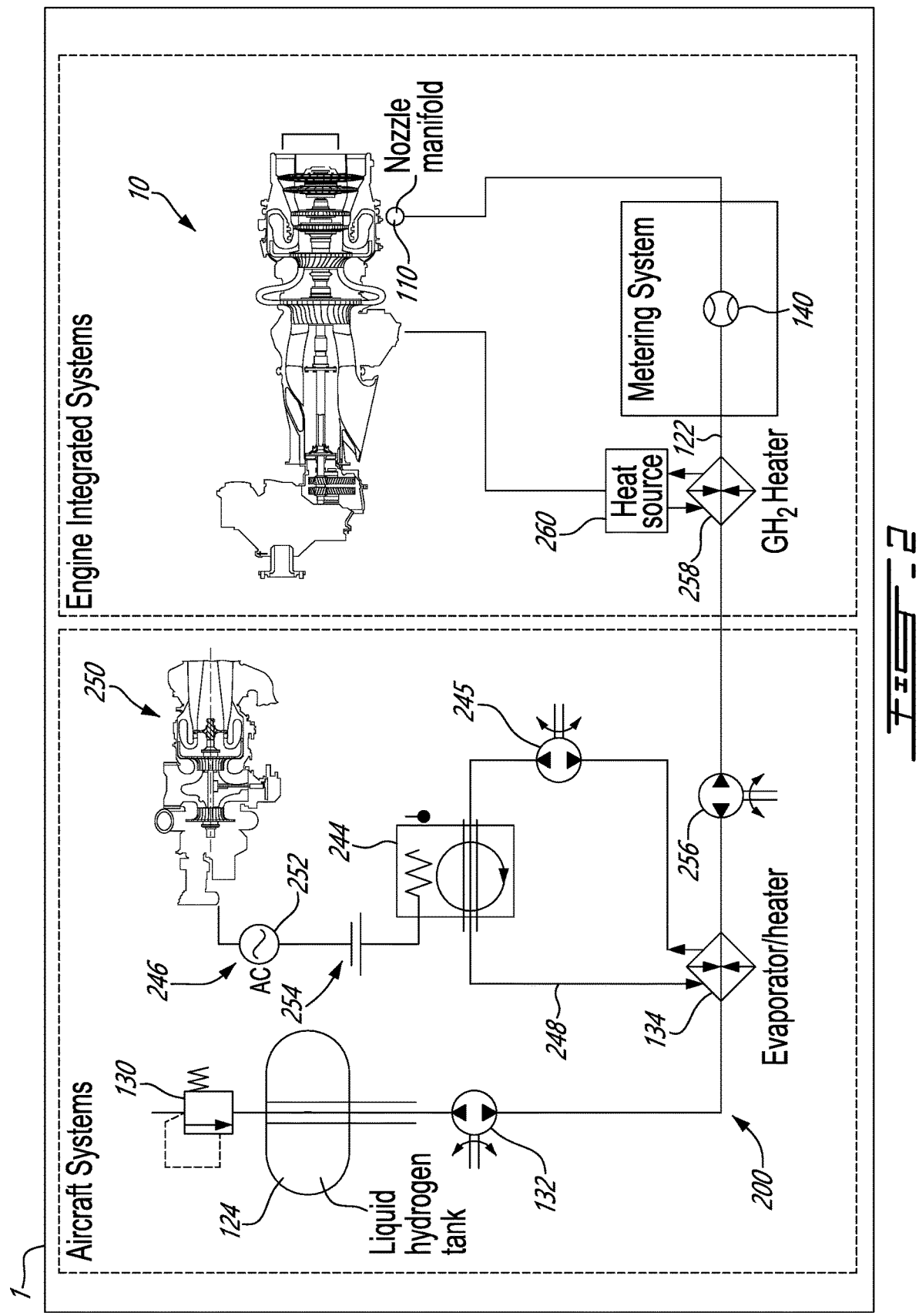
FIG. 2 is schematic view of an embodiment of a multi stage heated fuel system constructed in accordance with at least one aspect of this disclosure, showing a heat source of a gaseous hydrogen heater.

As shown in FIG. 2, in accordance with at least one aspect of this disclosure, there is provided a multi-stage heated fuel system 200 for hydrogen fuel for aircraft 1. The pump 132 is in fluid communication with the liquid hydrogen tank 124 to drive fuel from the liquid hydrogen tank 124 to the gas turbine engine 10 via the fuel feed conduit 122.

An upstream working fluid conduit 248 is defined at least in part by an upstream heater circuit, which branches off of the fuel feed conduit 122. An electric heat source 244 (e.g. a resistive heater) is disposed in the upstream heater circuit. The electric heat source 244 is in thermal communication with the upstream working fluid flowing through the upstream working fluid conduit 248 to add heat to the upstream working fluid.

An upstream working fluid pump 245 can be disposed in the upstream heater circuit to drive working fluid through the upstream heater circuit, passing through the electric heat source 244 and the evaporator 134. The upstream working fluid conduit 248 is in fluidly connected to the evaporator 134 to add heat into a flow of hydrogen passing through the evaporator 134. The upstream working fluid conduit 248 is fluidly isolated from the flow of liquid hydrogen within the evaporator 134 but is in thermal communication with the flow of hydrogen passing through the evaporator 134 for exchanging heat from the upstream working fluid to the flow liquid hydrogen passing through the evaporator 134.

An electric energy source 246 is associated with the electric heat source 244 to power the electric heat source 244. The electric energy source can be external to the gas turbine engine 10, and can be or include at least one of: an auxiliary power unit 250, an electric generator 252, and/or a battery 254 operatively connected to power the electric source 244.

Still with reference to FIG. 2, In certain embodiments, the fuel feed conduit 122 is further defined by a gaseous hydrogen pump 256 downstream of the evaporator 134, fluidly connecting an outlet of the evaporator 134 to the gas turbine engine 10 to drive gaseous hydrogen from the evaporator 134 to the gas turbine engine 10. The fuel feed conduit can be further defined by a gaseous hydrogen heater 258 downstream of the gaseous hydrogen pump 256 and upstream of the gas turbine engine 10. The gaseous hydrogen heater 258 is associated with a downstream heat source 260 internal to the engine 10 to add heat to the flow of gaseous hydrogen passing through the gaseous hydrogen heater 258.

Figure 3:
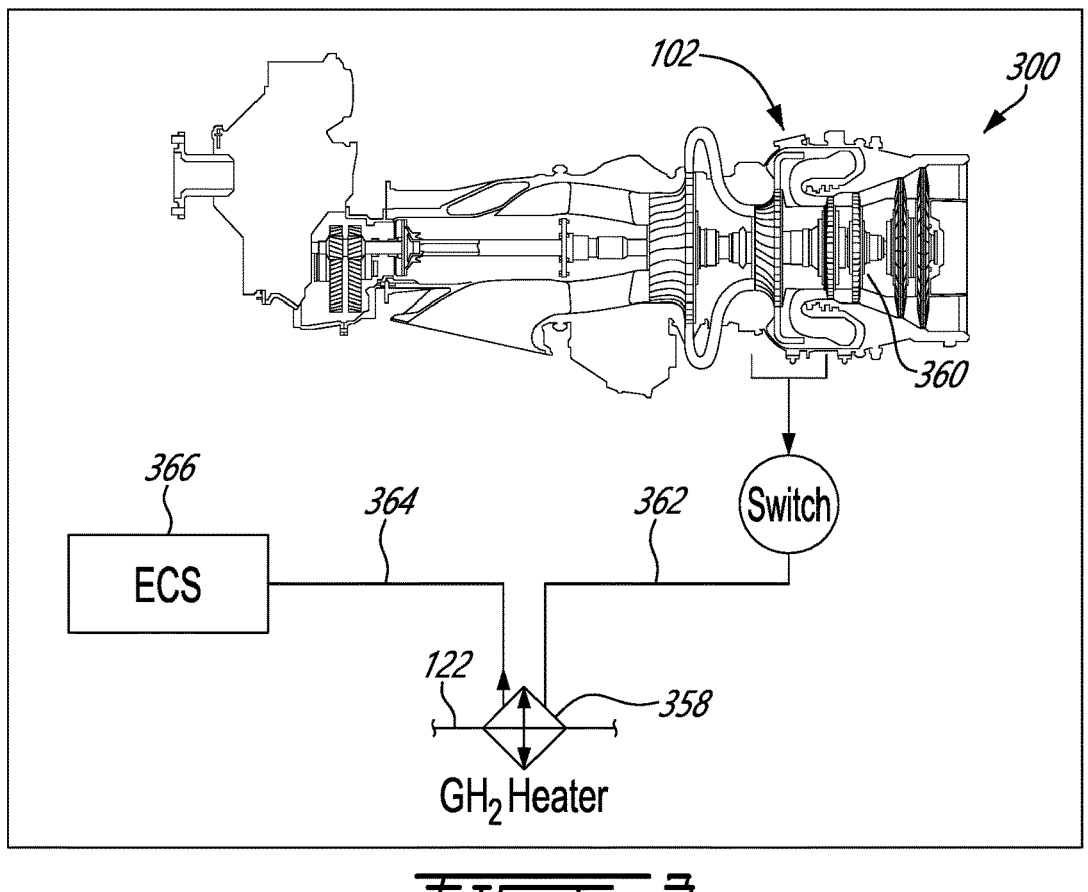
FIG. 3 is schematic view of another embodiment of the multi stage heated fuel system of FIG. 2.

Referring now to FIG. 3, in certain embodiments a system 300 can have similar components as in system 200. For brevity, the description of common elements that have been described above are not repeated with respect to FIG. 3. In system 300, the downstream heat source 360 is compressor bleed air from the compressor section 102. A bleed air conduit 362 fluidly connects the compressor section 102 with the gaseous hydrogen heater 358 to add heat from the compressor section 102 to the flow of gaseous hydrogen passing through the gaseous hydrogen heater 358.

In certain embodiments, an environmental control system return conduit 364 conveys cooled compressor bleed air to an environmental control system (ECS) 366. In certain embodiments, a switching module can be disposed in the bleed air conduit 362 to allow the option of using either the low pressure compressor bleed air (e.g. lower temperature) as the downstream heat source 360) or high pressure compressor bleed air (e.g. higher temperature) as the downstream heat source 360, depending on the amount of heat needed for the gaseous hydrogen heater 358 and the amount of cooling air required for the ECS 366.

Figure 4:
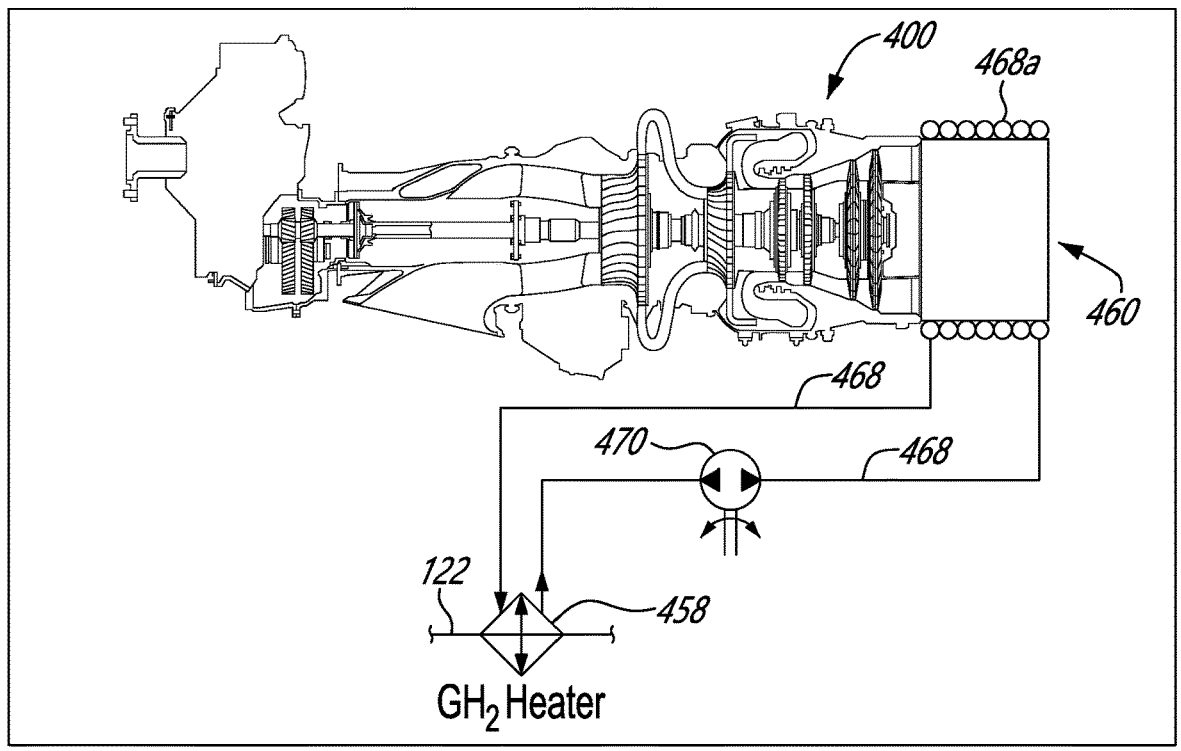
FIG. 4 is schematic view of another embodiment of the multi stage heated fuel system of FIG. 2.

Referring to FIG. 4, in certain embodiments a system 400 can have similar components as in system 200. For brevity, the description of common elements that have been described above are not repeated with respect to FIG. 4. In the system 400, the downstream heat source 460 can be turbine exhaust from a turbine exhaust section (e.g. turbine outlet 118) of the gas turbine engine 10. A downstream working fluid conduit 468 defines a downstream heater circuit which branches off the fuel feed conduit 122. In certain embodiments, the downstream working fluid conduit 468 is at least partially coiled (e.g. portion 468a) around the turbine exhaust section 118.

A downstream working fluid pump 470 is disposed in the downstream working fluid conduit 468 to drive downstream working fluid through the downstream heater circuit, passing through the coiled portion 468a and to the gaseous hydrogen heater 458 to add heat to the flow of gaseous hydrogen passing through the gaseous hydrogen heater 458. The downstream working fluid conduit 468 is fluidly isolated from the flow of liquid hydrogen within the gaseous hydrogen heater 458 but is in thermal communication with the flow of hydrogen passing through the gaseous hydrogen heater 458 for exchanging heat from the downstream working fluid to the flow gaseous hydrogen passing through the gaseous hydrogen heater 458.

Figure 5:
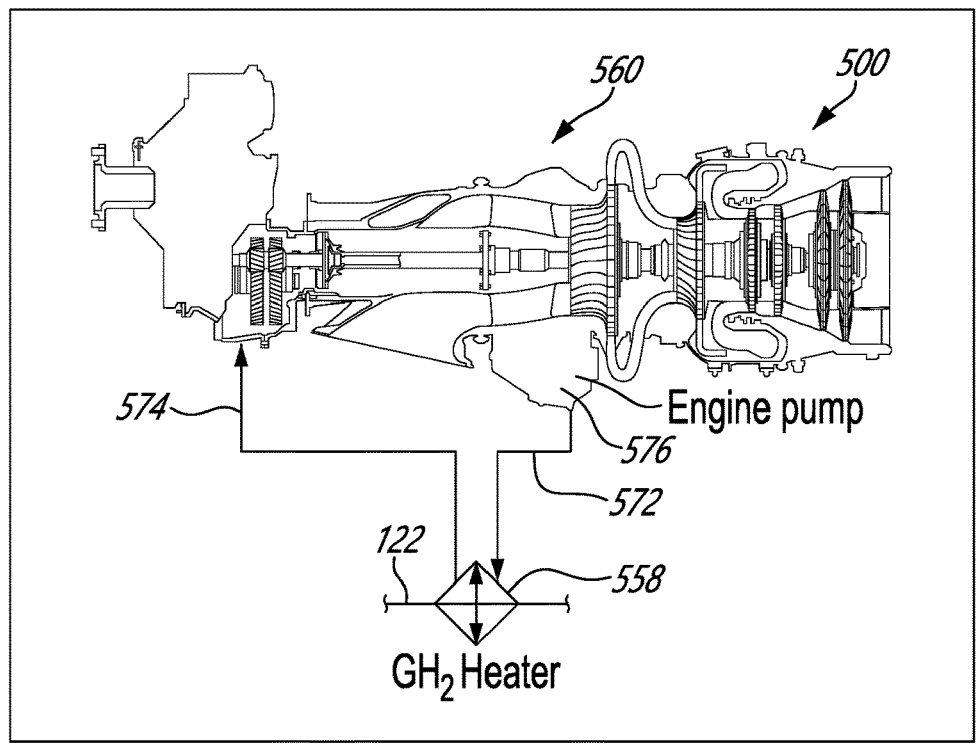
FIG. 5 is schematic view of another embodiment of the multi stage heated fuel system of FIG. 2.

Referring to FIG. 5, in certain embodiments a system 500 can have similar components as in system 200. For brevity, the description of common elements that have been described above are not repeated with respect to FIG. 5. In system 500, the downstream heat source 560 is an engine fluid (e.g. engine oil). An engine fluid conduit is defined at least in part by an engine fluid feed conduit 572 and an engine fluid return conduit 574 fluidly connecting between the gas turbine engine 10 and the gaseous hydrogen heater 558 to convey the hot engine fluid from the engine 10 to the gaseous hydrogen heater 558 to add heat to the flow of gaseous hydrogen passing through the gaseous hydrogen heater 558. An engine pump 576 can be disposed in the compressor section 102 to drive the engine fluid from the engine 10 to the gaseous hydrogen heater 558.

Figure 6:
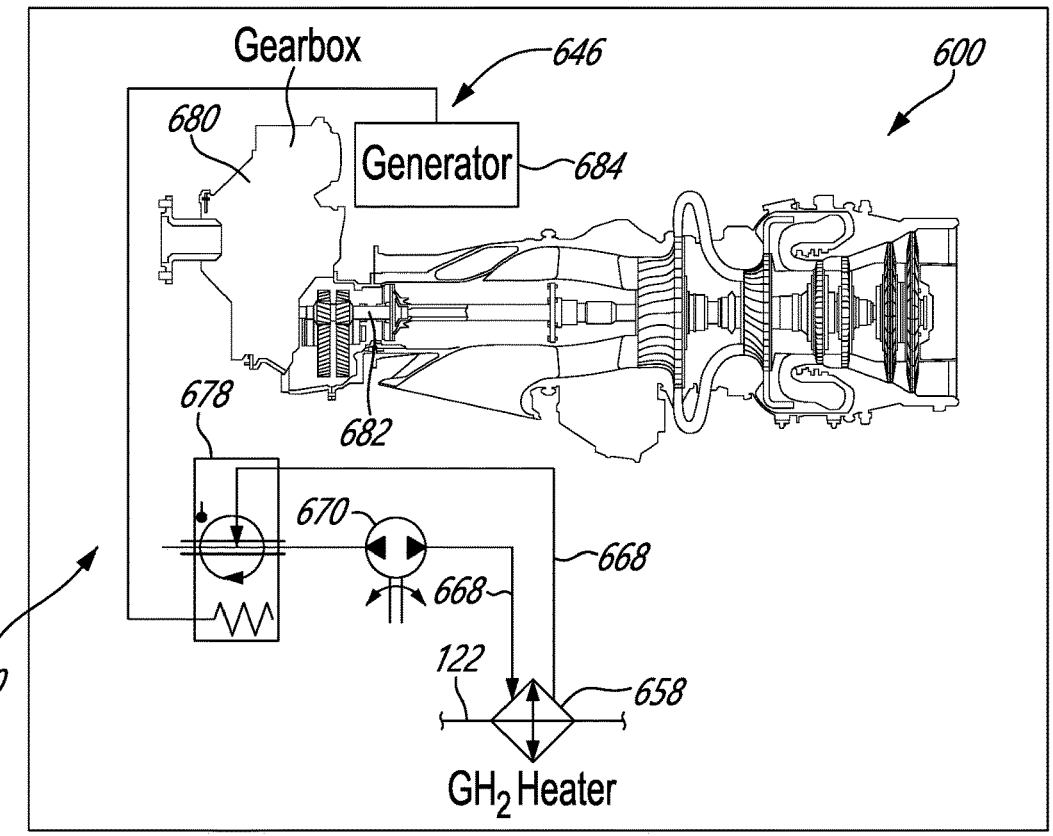
FIG. 6 is schematic view of another embodiment of the multi stage heated fuel system of FIG. 2.

Referring now to FIG. 6, in certain embodiments a system 600 can have similar components as in system 200. For brevity, the description of common elements that have been described above are not repeated with respect to FIG. 6. In system 600, the downstream heat source 660 is an electric heat source 678 (e.g. resistive heater), where the electric heat source 678 is external to, but powered by an electric energy module 646 driven by the gas turbine engine 10. For example, a gear box 680 is operatively connected to be driven by a spool shaft 682 of the gas turbine engine 10. The electric energy module 646 includes an electric generator 684 operatively connected to be driven by the gear box 682 to power the electric heat source 678 associated with the gaseous hydrogen heater 658. A downstream working fluid conduit 668 defines a downstream heater circuit which branches off the fuel feed conduit 122.

A downstream working fluid pump 670 is disposed in the downstream working fluid conduit 668 to drive downstream working fluid through the downstream heater circuit, passing through the electric heat source 678 to the gaseous hydrogen heater 658 to add heat to the flow of gaseous hydrogen passing through the gaseous hydrogen heater 658. The downstream working fluid conduit 668 is fluidly isolated from the flow of liquid hydrogen within the gaseous hydrogen heater 658 but is in thermal communication with the flow of hydrogen passing through the gaseous hydrogen heater 658 for exchanging heat from the downstream working fluid to the flow gaseous hydrogen passing through the gaseous hydrogen heater 658.

In accordance with yet another aspect of this disclosure, there is provided a method of heating fuel in an aircraft (e.g. aircraft 1). The method includes heating a flow of liquid hydrogen with an evaporator (e.g. evaporator 134) in thermal communication with an upstream heat source (e.g. heat source 244) to convert the flow of liquid hydrogen to a flow of gaseous hydrogen. The method includes heating the flow of gaseous hydrogen with a gaseous hydrogen heater (e.g. 258, 358, 458, 558, 658) in thermal communication with a downstream heat source (e.g. 260, 360, 460, 560, 660).

In certain embodiments, the upstream heat source is external to a gas turbine engine (e.g. engine 10) and the downstream heat source is internal to the gas turbine engine. In certain such embodiments, heating the flow of liquid hydrogen includes exchanging heat between an upstream heating working fluid in thermal communication with the upstream heat source and the flow of liquid hydrogen in the evaporator. In certain embodiments, the method includes powering the upstream heat source with at least one of an auxiliary power unit, an electric generator, and/or an electric energy module.

In certain embodiments, heating the flow of gaseous hydrogen includes exchanging heat between an engine fluid and the flow of gaseous hydrogen in the gaseous hydrogen heater. In certain such embodiments, the engine fluid includes at least one of: compressor bleed air, turbine exhaust, and/or engine oil.

In certain embodiments, heating the flow of gaseous hydrogen includes exchanging heat between a downstream working fluid in thermal communication with the downstream heat source and the flow of gaseous hydrogen in the gaseous hydrogen heater. In certain such embodiments, powering the downstream heat source with an electric generator (e.g. generator 684) driven by the gas turbine engine.

In embodiments, liquid hydrogen (LH2) can be pumped from the aircraft cryogenic tanks using an electrically driven LH2 pump. Depending on the heat required to evaporate the LH2, one engine heat source or multiple heat sources can then heat the cold (e.g. 20 K) liquid hydrogen to convert it from liquid to a gaseous state (e.g. 50 K) where it can then be combusted in the engine to produce power. In certain configurations, engine bleed or waste heat (e.g. exhaust and oil) can used for evaporation of LH2 removing the need for additional heat energy.

In embodiments, if the engine heat sources (e.g. total thermal energy available) are insufficient to convert the liquid hydrogen to gaseous state and raise its temperature for distribution and combustion in the engine, the heating may occur in multiple stages of the aircraft power plant systems. In certain configurations, the LH2 can first be evaporated to gaseous state using an electrically powered heat exchanger with an intermediate fluid medium to avoid ignition. The electric power supply can come from either an auxiliary power unit (e.g. a thermal engine) and/or electric power storage unit (battery pack). Subsequently, the cold gaseous hydrogen (GH2) can be further heated using heat sources in the engine (e.g. as described herein). In embodiments, the engine heat sources may be used independently, in parallel or in series depending on the final GH2 heat requirements. The multi-stage evaporator and heating approach can be advantageous, for example, by separating the evaporation phase from the engine, the supply of GH2 for the engine is not coupled to the heat output of the engine, meaning for certain low heat output phases (e.g. at engine starting phase, engine ground idle or flight idle running conditions), there is adequate GH2 to start the thermal cycle engine per example.

In embodiments, evaporating the LH2 or heating the GH2 can be accomplished by using hot compressor bleed air, normally used for the aircraft environmental control system (ECS). An additional potential benefit of this configuration can be the ECS bleed air would be cooled by the LH2, thus eliminating the need for a typical ECS pre-cooler. A switching valve can be included in this embodiment to allow for switching between the low pressure compressor bleed air (e.g. lower temperature and lower impact on performance) or high pressure compressor bleed air (e.g. higher temperature more impact on performance), depending on the amount of evaporation needed or cooling needed for the ECS.

In certain embodiments, heat from the exhaust can be used to heat a surrounding fluid (e.g. coiled around the exhaust) which in turn is used to evaporate LH2 in a heat exchanger and change its state from liquid to gaseous form. This source of heat may (if needed) be added in series to the compressor air heat source (e.g. multi-stage heating using three or more heating stages) in order to produce gaseous hydrogen a higher rate or to raise the gaseous hydrogen output temperature higher prior to combustion.

In certain embodiments, hot engine oil can be used in series with any of the other means of heating as described herein. While engine oil heating may be less effective on its own than other methods described above (e.g. due to the lower temperature of the oil compared to bleed air, or exhaust air, for example), engine oil heating can be used in combination with any other method to provide supplemental heat if needed or desired. The heat exchange between the cold LH2 and hot engine oil also additionally provides a means of removing heat from the engine oil which can normally be done using an air-oil heat exchanger. By reducing the size (or eliminating altogether) the air-oil heat exchanger, engine weight and aircraft drag (e.g. smaller cooler inlet) can be reduced.

In certain embodiments, heating the LH2 can be accomplished using an electric resistive heating source powered by the engine (or from another source such as an APU or other electric module) to heat a fluid which would in turn exchange heat with the cold liquid hydrogen. This differs from system 200 for example, because it uses an engine mounted generator rather than a separate APU or battery system in the aircraft. This means for heating could also be used in series with the other heating sources and provides the extra advantage of being able to tune the amount of fine tune the amount of heating as required by changing the amount of current delivered to the heat source. By combining these methods (e.g. any or all of the means provided herein with respect to systems 200, 300, 400, 500, 600), the rate of gaseous hydrogen flow required for the engine can be maximized and controlled.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

For example, the following particular embodiments of the present technology are likewise contemplated, as described herein next by clauses.

Clause 1. A hydrogen fuel system (100) for aircraft (1) comprising:
a gas turbine engine (100);
a fuel feed conduit (122) defined at least in part by, in fluid series,
  a liquid hydrogen tank (124) fluidly connected to a combustor (108) of the gas turbine engine;
  a liquid hydrogen pump (132) to drive fuel to the combustor of the gas turbine engine;
  an evaporator (134); and
  an electric heat source (144) in thermal communication with the evaporator to add heat into a flow of hydrogen passing through the evaporator; and
an electric energy source (246) associated with the electric heat source to power the electric heat source.

Clause 2. The system as recited in clause 1, wherein the fuel feed conduit is further defined by, in fluid series downstream of the evaporator, an accumulator (138), a pressure regulator (139), a gaseous hydrogen metering unit (140), a manifold shut-off valve (140), and a fuel manifold (142).

Clause 3. The system as recited in clause 2, further comprising:
an upstream working fluid conduit (248) in fluid communication with the evaporator and defined at least in part by:
  an electric heat source (244) operative to add heat into the working fluid for heat exchange with the flow of hydrogen passing through the evaporator; and
  and an upstream working fluid pump (245) to drive the working fluid through the evaporator.

Clause 4. The system as recited in clause 3, wherein the electric energy source is external to the gas turbine engine, and wherein the electric energy source includes at least one of: an auxiliary power unit (250), an electric generator (252), and/or a battery (254) operatively connected to power the electric heat source.

Clause 5. The system as recited in clause 2, wherein the fuel feed conduit is further defined by:
a gaseous hydrogen pump (256) downstream of the evaporator drive a flow of gaseous hydrogen from the evaporator to the combustor of the gas turbine engine; and
a gaseous hydrogen heater (258) downstream of the gaseous hydrogen pump and upstream of the gas turbine engine, wherein the gaseous hydrogen heater is associated with an engine heat source (260) internal to the engine to add heat to the flow of gaseous hydrogen passing through the gaseous hydrogen heater.

Clause 6. The system as recited in clause 5, wherein the engine heat source is compressor bleed air from a compressor section (102), and further comprising:
a bleed air conduit (362) defined at least in part by the compressor section of the gas turbine engine and the gaseous hydrogen heater to add heat to the flow of gaseous hydrogen passing through the gaseous hydrogen heater and to cool the compressor bleed air passing through the gaseous hydrogen heater; and an environmental control system return conduit (364) defined at least in part by the compressor section of the gas turbine engine and an environmental control system (366), to flow the cooled compressor bleed air to the environmental control system.

Clause 7. The system as recited in clause 5, wherein the engine heat source is turbine exhaust from a turbine exhaust section (118) of the gas turbine engine, and further comprising a downstream working fluid conduit (468) defined at least in part by:
  the turbine exhaust section of the gas turbine engine;
  the gaseous hydrogen heater; and
  a downstream working fluid pump (470) to drive heated downstream working fluid to the gaseous hydrogen heater to add heat to the flow of gaseous hydrogen passing through the gaseous hydrogen heater.

Clause 8. The system as recited in clause 7, wherein the downstream working fluid conduit is at least partially coiled (468a) around the turbine exhaust section of the gas turbine engine to add heat from the turbine exhaust section of the gas turbine engine to the flow of downstream working fluid in the downstream working fluid conduit.

Clause 9. The system as recited in clause 5, wherein the engine heat source is engine fluid, and further comprising an engine fluid conduit (562) defined at least in part by, in fluid series,
  an engine fluid source (572);
  the gaseous hydrogen heater (558); and and an engine fluid return (574), to add heat from the engine fluid to the flow of gaseous hydrogen passing through the gaseous hydrogen heater.

Clause 10. The system as recited in clause 4, wherein the fuel feed conduit is further defined by:
 a gaseous hydrogen pump (256) downstream of the evaporator drive a flow of gaseous hydrogen from the evaporator to the combustor of the gas turbine engine; and
 a gaseous hydrogen heater (658) downstream of the gaseous hydrogen pump and upstream of the gas turbine engine, wherein the gaseous hydrogen heater is associated with an electric heat source (678) to add heat to the flow of gaseous hydrogen passing through the gaseous hydrogen heater, wherein the electric heat source is external to, but powered by an electric energy module (646) driven the gas turbine engine.

Clause 11. The system as recited in clause 10, further comprising, a gear box (680) operatively connected to be driven by a spool shaft (682) of the gas turbine engine, wherein the electric energy source (678) includes an electric generator (684) operatively connected to be driven by the gear box to power the electric heat source associated with the gaseous hydrogen heater.

Clause 12. The system as recited in clause 11, further comprising a downstream working fluid conduit (668) defined at least in part by,
 the gaseous hydrogen heater,
 the electric heat source to add heat the downstream working fluid; and
 a downstream working fluid pump (670) to drive the downstream working fluid to the gaseous hydrogen heater to add heat to the flow of gaseous hydrogen passing through the gaseous hydrogen heater.

Clause 13. A multi-stage heating system (200) for an aircraft (1) comprising:
 a gas turbine engine (10);
 a fuel feed conduit (122) defined at least in part by, in fluid series,
  a liquid hydrogen tank (124) fluidly connected to a combustor (108) of the gas turbine engine;
  a liquid hydrogen pump (132) to drive fuel to the combustor of the gas turbine engine;
  an evaporator (134) in thermal communication with an upstream heat source (144) to add heat into a flow of hydrogen passing through the evaporator;
  a gaseous hydrogen pump (256) downstream of the evaporator drive a flow of gaseous hydrogen from the evaporator to the combustor of the gas turbine engine; and
  a gaseous hydrogen heater (258) in thermal communication with a downstream heat source to add heat into the flow of gaseous hydrogen passing through the gaseous hydrogen heater.

Clause 14. The system as recited in clause 13, wherein the upstream heat source is external to the gas turbine engine, wherein the downstream heat source is internal to the gas turbine engine.

Clause 15. A method of heating fuel in an aircraft (1), comprising:
 heating a flow of liquid hydrogen with an evaporator (134) in thermal communication with an upstream heat source (144) to convert the flow of liquid hydrogen to a flow of gaseous hydrogen; and
 heating the flow of gaseous hydrogen with a gaseous hydrogen heater (248) in thermal communication with a downstream heat source (260),
  wherein the upstream heat source is external to a gas turbine engine and the downstream heat source is internal to the gas turbine engine.

Clause 16. The method as recited in clause 15, wherein the heating the flow of liquid hydrogen includes exchanging heat between an upstream working fluid in thermal communication with the upstream heat source and the flow of liquid hydrogen in the evaporator.

Clause 17. The method as recited in clause 16, further comprising powering the upstream heat source with at least one of an auxiliary power unit (250), an electric generator (252), and/or an electric energy module (254).

Clause 18. The method as recited in clause 15, wherein the heating the flow of gaseous hydrogen includes exchanging heat between an engine fluid and the flow of gaseous hydrogen in the gaseous hydrogen heater, wherein the engine fluid includes at least one of: compressor bleed air, turbine exhaust, and/or engine oil.

Clause 19. The method as recited in clause 15, wherein the heating the flow of gaseous hydrogen includes exchanging heat between a downstream working fluid in thermal communication with the downstream heat source and the flow of gaseous hydrogen in the gaseous hydrogen heater.

Clause 20. The method as recited in clause 19, further comprising powering the downstream heat source with an electric generator (684) driven by the gas turbine engine.

What is claimed is:

1. A hydrogen fuel system for aircraft comprising:
 a gas turbine engine;
 a fuel feed conduit defined at least in part by, in fluid series,
  a liquid hydrogen tank fluidly connected to a combustor of the gas turbine engine;
  a liquid hydrogen pump to drive fuel to the combustor of the gas turbine engine;
  an evaporator disposed downstream of the liquid hydrogen pump relative to a flow of hydrogen fuel through the fuel feed conduit, the evaporator having a hydrogen circuit and a heater circuit fluidly isolated from the hydrogen circuit; and
  an electric heat source disposed in the heater circuit of the evaporator and in thermal communication with a working fluid flowing through the heater circuit, the electric heat source operational to generate a sufficient amount of thermal energy to convert a flow of liquid hydrogen fuel passing through the hydrogen circuit of the evaporator to a flow of gaseous hydrogen fuel; and
 an electric energy source associated with the electric heat source to power the electric heat source.

2. The system as recited in claim 1, wherein the fuel feed conduit is further defined by, in fluid series downstream of the evaporator, an accumulator, a pressure regulator, a gaseous hydrogen metering unit, a manifold shut-off valve, and a fuel manifold.

3. The system as recited in claim 1 wherein the heater circuit of the evaporator forms part of an upstream working fluid conduit including:
 an upstream working fluid pump to drive the working fluid through the evaporator and the electric heat source.

4. The system as recited in claim 1, wherein the electric energy source is external to the gas turbine engine, and wherein the electric energy source includes at least one of: an auxiliary power unit, an electric generator, and/or a battery operatively connected to power the electric heat source.

5. The system as recited in claim 2, wherein the fuel feed conduit is further defined by:
   a gaseous hydrogen pump downstream of the evaporator drive a flow of gaseous hydrogen from the evaporator to the combustor of the gas turbine engine; and
   a gaseous hydrogen heater downstream of the gaseous hydrogen pump and upstream of the gas turbine engine, wherein the gaseous hydrogen heater is associated with an engine heat source internal to the engine to add heat to the flow of gaseous hydrogen passing through the gaseous hydrogen heater.

6. The system as recited in claim 5, wherein the engine heat source is compressor bleed air from a compressor section, and further comprising:
   a bleed air conduit defined at least in part by the compressor section of the gas turbine engine and the gaseous hydrogen heater to add heat to the flow of gaseous hydrogen passing through the gaseous hydrogen heater and to cool the compressor bleed air passing through the gaseous hydrogen heater; and
   an environmental control system return conduit defined at least in part by the compressor section of the gas turbine engine and an environmental control system, to flow the cooled compressor bleed air to the environmental control system.

7. The system as recited in claim 5, wherein the engine heat source is turbine exhaust from a turbine exhaust section of the gas turbine engine, and further comprising a downstream working fluid conduit defined at least in part by:
   the turbine exhaust section of the gas turbine engine;
   the gaseous hydrogen heater; and
   a downstream working fluid pump to drive heated downstream working fluid to the gaseous hydrogen heater to add heat to the flow of gaseous hydrogen passing through the gaseous hydrogen heater.

8. The system as recited in claim 7, wherein the downstream working fluid conduit is at least partially coiled around the turbine exhaust section of the gas turbine engine to add heat from the turbine exhaust section of the gas turbine engine to the flow of downstream working fluid in the downstream working fluid conduit.

9. The system as recited in claim 5, wherein the engine heat source is engine fluid, and further comprising an engine fluid conduit defined at least in part by, in fluid series,
   an engine fluid source;
   the gaseous hydrogen heater; and
   and an engine fluid return to add heat from the engine fluid to the flow of gaseous hydrogen passing through the gaseous hydrogen heater.

10. The system as recited in claim 4, wherein the fuel feed conduit is further defined by:
    a gaseous hydrogen pump downstream of the evaporator drive a flow of gaseous hydrogen from the evaporator to the combustor of the gas turbine engine; and
    a gaseous hydrogen heater downstream of the gaseous hydrogen pump and upstream of the gas turbine engine, wherein the gaseous hydrogen heater is associated with an electric heat source to add heat to the flow of gaseous hydrogen passing through the gaseous hydrogen heater, wherein the electric heat source is external to, but powered by an electric energy module driven the gas turbine engine.

11. The system as recited in claim 10, further comprising, a gear box operatively connected to be driven by a spool shaft of the gas turbine engine, wherein the electric energy source includes an electric generator operatively connected to be driven by the gear box to power the electric heat source associated with the gaseous hydrogen heater.

12. The system as recited in claim 11, further comprising a downstream working fluid conduit defined at least in part by,
    the gaseous hydrogen heater;
    the electric heat source to heat a downstream working fluid; and
    a downstream working fluid pump to drive the downstream working fluid to the gaseous hydrogen heater to add heat to the flow of gaseous hydrogen passing through the gaseous hydrogen heater.

13. A multi-stage heating system for an aircraft, comprising:
    a gas turbine engine;
    a fuel feed conduit defined at least in part by, in fluid series,
       a liquid hydrogen tank fluidly connected to a combustor of the gas turbine engine;
       a liquid hydrogen pump to drive fuel to the combustor of the gas turbine engine;
       an evaporator in thermal communication with an upstream heat source, the evaporator disposed downstream of the liquid hydrogen pump relative to a flow of hydrogen fuel through the fuel feed conduit, the evaporator having a hydrogen circuit and a heater circuit fluidly isolated from the hydrogen circuit, the upstream heat source including an electric heat source disposed in the heater circuit of the evaporator and in thermal communication with a working fluid flowing through the heater circuit, the evaporator operational to transfer thermal energy from the working fluid to a flow of liquid hydrogen passing through the evaporator, the electric heat source operational to generate a sufficient amount of thermal energy for converting the flow of liquid hydrogen to a flow of gaseous hydrogen in the evaporator; and
       a gaseous hydrogen heater in thermal communication with a downstream heat source to add heat into the flow of gaseous hydrogen passing through the gaseous hydrogen heater.

14. The system as recited in claim 13, wherein the upstream heat source is external to the gas turbine engine, wherein the downstream heat source is internal to the gas turbine engine.

15. A method of heating fuel in an aircraft, comprising:
    heating a flow of liquid hydrogen with an evaporator in thermal communication with an upstream heat source, the upstream heat source including an electric heat source operatively connected to an electric energy source, wherein thermal energy from the electric heat source is transferred to a working fluid flowing through the evaporator, and wherein an amount of the thermal energy from the electric heat source is selected to convert the flow of liquid hydrogen to a flow of gaseous hydrogen in the evaporator; and
    heating the flow of gaseous hydrogen with a gaseous hydrogen heater in thermal communication with a downstream heat source,
    wherein the upstream heat source is external to a gas turbine engine and the downstream heat source is internal to the gas turbine engine.

16. The method as recited in claim 15, further comprising powering the upstream heat source with at least one of an auxiliary power unit, an electric generator, and/or an electric energy module.

17. The method as recited in claim 15, wherein the heating the flow of gaseous hydrogen includes exchanging heat between an engine fluid and the flow of gaseous hydrogen in the gaseous hydrogen heater, wherein the engine fluid includes at least one of: compressor bleed air, turbine exhaust, and/or engine oil.

18. The method as recited in claim 15, wherein the heating the flow of gaseous hydrogen includes exchanging heat between a downstream working fluid in thermal communication with the downstream heat source and the flow of gaseous hydrogen in the gaseous hydrogen heater.

19. The method as recited in claim 18, further comprising powering the downstream heat source with an electric generator driven by the gas turbine engine.

\* \* \* \* \*